United States Patent [19]

Jurgens et al.

[11] Patent Number: 4,732,225

[45] Date of Patent: Mar. 22, 1988

[54] DEEP-BOREHOLE DRILLING DEVICE WITH MAGNETIC COUPLING

[75] Inventors: Rainer Jurgens, Osterloh; Ulrich Hense, Hambuhren, both of Fed. Rep. of Germany

[73] Assignee: Norton Christensen, Inc., Salt Lake City, Utah

[21] Appl. No.: 10,750

[22] Filed: Feb. 4, 1987

[30] Foreign Application Priority Data

Feb. 12, 1986 [DE] Fed. Rep. of Germany ....... 3604270

[51] Int. Cl.$^4$ ............................ E21B 4/02; E21B 4/04
[52] U.S. Cl. ...................................... 175/92; 175/104; 175/107; 166/66.5; 464/29
[58] Field of Search .................. 175/92, 104, 107; 166/65.1, 66.4, 66.5; 464/29

[56] References Cited

U.S. PATENT DOCUMENTS

| 2,531,120 | 11/1950 | Feaster | 175/104 |
| 3,389,758 | 6/1968 | Buhler | 175/104 |
| 4,115,040 | 9/1978 | Knorr | 464/29 |
| 4,120,618 | 10/1978 | Klaus | 464/29 |
| 4,679,636 | 7/1987 | Ruhle | 175/104 |

Primary Examiner—James A. Leppink
Assistant Examiner—Terry Lee Melius

[57] ABSTRACT

A deep-borehole drilling device comprising a drive unit such as a downhole motor and a driven unit such as a generator in which a drive transmission coupling is provided in the form of a contact-free magnetic coupling. The magnetic coupling may be a permanent magnet coupling with the magnets arranged coaxially and is preferably a can-tube coupling comprising an outer magnet carrier and a can-tube disposed coaxially within said outer magnet carrier.

8 Claims, 2 Drawing Figures

DEEP-BOREHOLE DRILLING DEVICE WITH MAGNETIC COUPLING

BACKGROUND OF THE INVENTION

1. Field of the Invention

This invention relates to a deep-borehole drilling device and more particularly concerns such devices which include a drive unit coupled to drive a driven unit by drive transmission coupling means.

2. Description of the Prior Art

In deep-borehole drilling devices, mechanical drive transmission couplings are generally used to couple drive units to driven units as these couplings exhibit no temperature dependence, function with very little wear, and establish a direct physical connection between driving parts and driven parts. Such an arrangement is described in German Pat. No. 26 20 801.

The object underlying the invention is to provide a drilling tool with contact-free drive transmission coupling between the drive unit and the driven unit.

SUMMARY OF THE INVENTION

According to the present invention there is provided a deep-borehole drilling device comprising a casing, a drive unit supported inside said casing, and with at least one driven unit, which is adapted to be driven by the drive unit, a drive transmission coupling enabling said driven unit to be driven by said drive unit, said coupling being a contact-free magnetic coupling.

Preferably the coupling is a coaxial permanent magnet coupling and is desirably a can-tube coupling, comprising an outer magnet carrier and a can-tube disposed coaxially within said outer magnet carrier with a clearance therebetween.

The clearance between the outer magnet carrier and the can-tube is preferably sealed by a sealing device. A labyrinth seal is particularly suitable, preferably a labyrinth seal which comprises a sleeve with coaxially surrounds the outer magnet carrier leaving a small clearance.

In the drilling device of the invention, rotary motion is transmitted from the drive unit to a driven unit in a manner involving no contact thus enabling the drive units and driven units to belong to separate systems. This is particularly important in applications where the drive unit is a downhole motor which is operated by drilling mud, and where there is a requirement to drive driven units in the form of sensors, generators or similar functional units which need to be encapsulated or otherwise sealed from the drilling mud.

BRIEF DESCRIPTION OF THE DRAWING

A more detailed representation of an illustrative embodiment of the subject matter of the invention is presented in the drawing, wherein.

Figure 1:
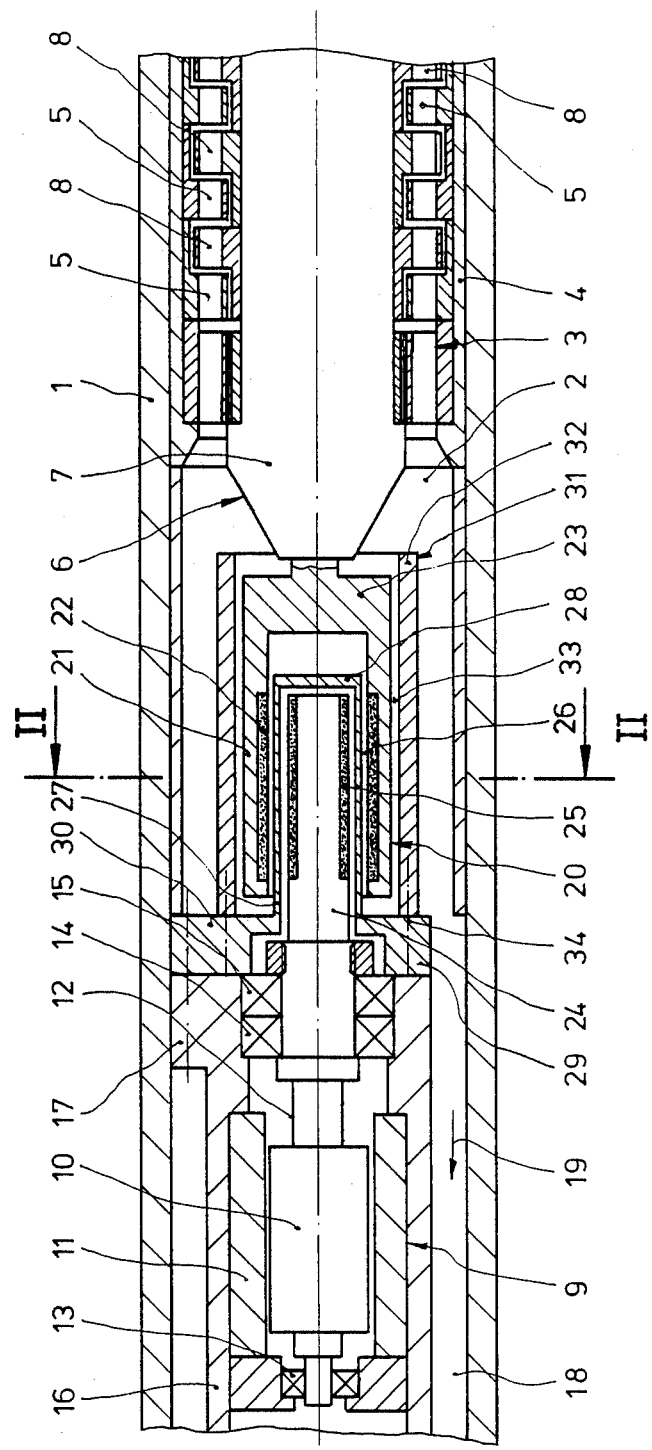
FIG. 1 is a truncated longitudinal section through a deep-borehole drilling device according to the invention.
Figure 2:
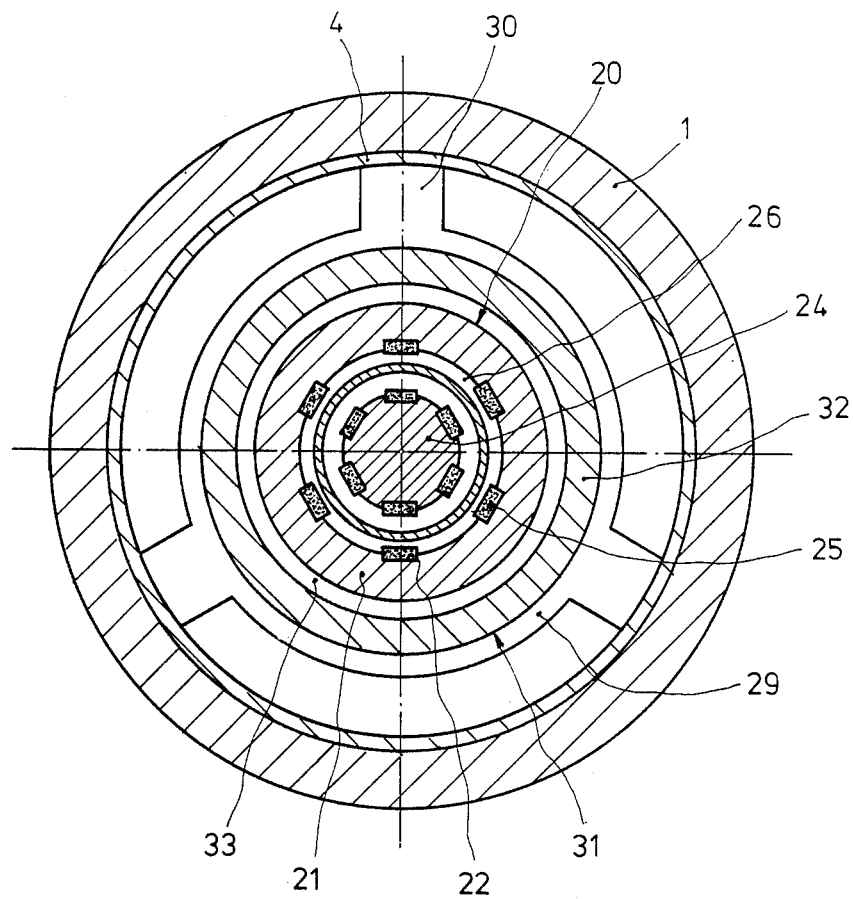
FIG. 2 is a section along line II—II in FIG. 1.

In detail, the deep-borehole drilling device, as diagrammatically illustrated in FIG. 1, comprises a tubular casing 1 which can form a portion of a borehole pipe string. A drive unit 2 is supported inside the casing 1. The drive unit may be of any known suitable design, but is preferably a downhole motor which is operated by the drilling mud, such as, for example, a turbine as shown in the drawing, or a displacement motor operating on the Moineau principle. As shown, the turbine comprises a stator 3, supported inside a tubular stator housing 4 and having stationary blade rings 5, and a rotor 6, having a rotor shaft 7 carrying blade rings 8 which revolve with it.

The drive unit 2 drives a driven unit 9 which may be any unit for which there is a need when drilling deep boreholes and which requires a rotary drive. Drive units which are of primary interest include generators, sensors and measuring instruments of all types and pumps although other driven units can be driven if required.

As shown in the drawing, the driven unit 9 is a generator, having a rotor 10 which can be rotated inside and coaxially with a stator assembly 11. The rotor shaft 12 is supported in an encapsulating housing 16, by means of bearings 13, 14, 15, while the housing 16 is supported in the casing 1, by means of radial projections 17, so as to leave a circumferential clearance 18 for the through-passage of drilling mud in the direction of the arrow 19.

So that the drive unit 2 may drive the driven unit 9, a contact-free permanent-magnet drive transmission coupling 20 is provided, which is preferably designed as a coaxial-magnet coupling, as in the illustrative embodiment shown. The drive transmission coupling 20 can be designed as a face-magnet coupling if desired.

In detail, the drive transmission coupling 20 consists of an outer magnet-carrier 21, in the form of a circular-profile tube, supporting permanent magnets 22 which are inset into its inner surface, so that they are located on a circular arc. On its end facing the rotor 6, the outer magnet-carrier 21 is closed-off by a blanking wall 23 and is connected, in the region of this wall, to the shaft 7 of the rotor 6 of the drive unit 2.

The drive transmission coupling 20 further comprises an inner magnet-carrier 24, which is designed in the form of a shaft extension and, in the example presented here, is a portion of the shaft 12 of the driven unit 9. Permanent magnets 25 are inset into the outer surface of the inner magnet-carrier 24, so that they, in their turn, are located on a circular arc. The number, size and shape of the magnets are governed by the torque which has to be transmitted in the particular drilling device. The arrangement of the magnets is governed by the geometric design of the drive transmission coupling 20, which depends on parameters such as the available inside diameter of the casing 1, etc.

In the embodiment shown, the drive transmission coupling 20 is a coaxial magnet coupling designed as a can-tube coupling. A can tube 27 is provided in the clearance 26, is closed-off by an end wall 28, and completely covers the inner magnet-carrier 24. The can tube 27 blends into a connecting flange 29 which is fixedly and sealingly connected to the encapsulating housing 16 of the driven unit 9, for example by means of screws. These screw-connections can be provided inside radial projections 30 which correspond to the projections 17 and are flush-located opposite and in axial alignment with them.

In order to prevent drilling mud from flowing through the clearance 26, between the can tube 27 and the outer magnet-carrier 21, carrying abrasive particles with it and entailing the possibility of wear or deposits which could cause malfunctions, the clearance 26 is preferably sealed-off from the surroundings by means of a sealing device. Any known or suitable sealing device may be used for this purpose, but a labyrinth seal 31 is preferred, the seal being formed by a sleeve 32 which coaxially surrounds the outer magnet-carrier 21 of the central-magnet coupling 20, leaving a small clearance. The sleeve 32 forms a labyrinth clearance 33 with the outer surface of the outer magnet-carrier 21, this clearance 33 being designed to be sufficiently narrow to prevent flow through the clearance 26. In the embodiment shown, the sleeve 32 is fixedly connected to the connecting flange 29, for example by means of screws at the position 34.

The rotor 6 of the drive unit 2 drives the shaft 12 of the driven unit 9 via the drive transmission coupling 20 in a manner which involves no contact, and thus facilitates the installation of the driven unit 9 in a fully encapsulated, separate system or section of the deep-borehole drilling device, and provides it with reliable protection against the ingress of drilling mud or other extraneous material.

We claim:

1. In a deep-borehole drilling device including a casing, at least one driven unit and a drive unit supported inside said casing to drive said at least one driven unit, and wherein mud flows through said casing to drive said driven unit, the improvement comprising:

a drive transmission coupling for effecting a driving relation between said at least one driven unit and said drive unit, said drive transmission being a contact-free magnetic coupling supported within said casing and including first magnetic means rotatingly driven by said drive unit and second magnetic means spaced from said first magnetic means and rotatingly driven thereby, said at least one driven unit being supported in said casing in sealed relation with respect to entrance of said mud into said at least one driven unit, said second magnetic means being sealingly connected to drive said at least one driven means, non-rotating means supported in said casing in spaced relation to said said first magnetic means, and seal means cooperating with said non-rotating means to prevent flow of mud into the space between said first and said second magnetic means.

2. In a deep-borehole drilling device as set forth in claim 1 wherein said contact-free magnetic coupling is a coaxial permanent-magnetic coupling.

3. In a deep-borehole drilling device as set forth in claim 2 in which the drive transmission coupling is a can-tube coupling, and said can-tube coupling including can-tube means disposed between and spaced from each of said first and second magnetic means.

4. In a deep-borehole drilling device as set forth in claim 3 wherein said means to prevent flow into said space includes seal means between said first magnetic means and said can tube means.

5. In a deep-borehole drilling device as set forth in claim 4 wherein said seal means is a labyrinth seal.

6. In a deep-borehole drilling device as set forth in claim 1 wherein each of said first and second magnetic means includes a plurality of spaced permanent magnets, the permanent magnets of said first magnetic means being concentrically disposed with respect to the permanent magnets of said second magnetic means.

7. In a deep-borehole drilling device as set forth in claim 1 wherein said drive means is a turbine.

8. In a deep-borehole drilling device as set forth in claim 1 wherein said drive means is a downhole motor.

* * * * *